3,640,988
PROCESS FOR THE POLYMERIZATION OF CONJUGATED DIENES WITH HALOARYLLITHIUM INITIATORS
William J. Trepka and Richard J. Sonnenfeld, Bartlesville, Okla., assignors to Phillips Petroleum Company
No Drawing. Filed Dec. 31, 1969, Ser. No. 889,747
Int. Cl. C08d *3/04, 3/08, 3/12*
U.S. Cl. 260—94.2 M                          5 Claims

ABSTRACT OF THE DISCLOSURE 1,3,5-tribromobenzene is employed as a polymerization modifier for the polymerization of conjugated dienes with haloaryllithium initiators wherein the use of the polymerization modifier reduces the molecular weight of the conjugated diene polymer while the high percentage of cis-configuration of the conjugated diene polymer is maintained.

---

This invention relates to an improved process for the polymerization of conjugated dienes. This invention relates to a process for producing polymers of conjugated dienes with improved processability. This invention further relates to the polymerization of conjugated dienes with haloaryllithium initiators and to the production of polymers of conjugated dienes having a high percentage of cis 1,4-addition and reduced inherent viscosity.

In a polymerization process for conjugated dienes using haloaryllithium initiators it is often desirable to produce a polymer with a reduced molecular weight and thereby provide a polymer with improved processability. These results can be achieved by conventional processes wherein increased amounts of haloaryllithium initiators are employed. However, this conventional method is oftentimes unsatisfactory in that increased initiator levels tends to reduce the percentage of cis-content of the final polymeric product.

It has now been surprisingly discovered that if 1,3,5-tribromobenzene is present during the polymerization of conjugated dienes with haloaryllithium initiators that the inherent viscosity of the resulting polymer is significantly reduced while the cis-content thereof is essentially unchanged.

This invention is particularly surprising in that the other halogen analogs, such as 1,3,5-trichlorobenzene are ineffective and further that the 1,3,5-tribromobenzene polymerization modifier of this invention is more than twice as effective as a modifier as is 1,3-dibromobenzene on a molar basis.

According to this invention, 1,3,5-tribromobenzene is employed as a polymerization modifier in an amount to provide from about 0.01 to 5 moles of modifier per each mole of initiator employed in the polymerization process, preferably from about 0.02 to 0.15 mole of modifier per mole of initiator. The 1,3,5-tribromobenzene can be charged to the polymerization reactor in any conventional manner known in the art. The modifier of this invention can be charged to the polymerization reactor concurrently with the initiator, before the initiator is charged, or at any time until the polymerization has gone to about 70 percent of normal completion, normal completion being essentially 100 percent polymerization of the monomers. The modifier can be added in increments, charged completely at one time, or added in any other conventional manner.

The rubbery polymers produced in accordance with this invention display improved processing characteristics and they can be compounded by any of the known methods such as have been used in the past for compounding rubbers. Vulcanizing agents, vulcanization accelerators, accelerator activators, reinforcing agents, antioxidants, softeners, plasticizers, fillers, and other compounding ingredients such as have been normally employed in rubbers can likewise be used in the polymers of this invention. The rubbery polymers produced according to this invention have utility in application where both natural and synthetic rubbers are used. In addition, the rubbery polymers produced by the method of this invention can be blended by any suitable method with other synthetic rubbers and/or natural rubbers. For example, they can be used in the manufacture of automobile tires, gaskets, and other rubbery articles.

According to this invention the haloaryllithium compounds that can be employed as polymerization initiators are 3 - halophenyllithium compounds, 1-halo-3-naphthyllithium compounds, and 3 - halo-1-naphthyllithium compounds, 4-halophenyllithium compounds and 4-halonaphthyllithium compounds which have been milled or otherwise subjected to attrition devices can also be employed according to this invention.

The haloaryllithium compounds can be represented by any one of the following formulas:

(a) 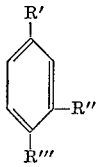

(b) 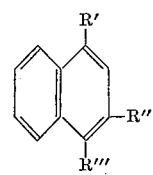

wherein R′, R″, and R′″ is one of hydrogen, lithium, or a halogen, said halogen selected from fluorine, bromine, or chlorine and wherein R′, R″, and R′″ are different from each other and wherein only one of R′, R″, or R′″ is a halogen wherein if R′″ is halogen R″ is not lithium, wherein if R″ is halogen R′″ is not lithium; or (c) mixtures of initiators represented by formulas (a) and (b).

As hereinbefore stated, the 4-halonaphthyllithium compounds and 4-halophenyllithium compounds which have been milled, such as by ball-milling, etc., can be employed according to this invention. The milling of these compounds increases their overall effectiveness.

The increase in activity of the 4-halophenyllithium is achieved by imparting an abrasive force upon the 4-halophenyllithium compounds such as by applying an abrasive action through various attrition devices.

Various mills and the like, wherein stainless steel balls, the walls of the vessel, blades or vanes of a stirrer, the solid particles of the compound itself, or the like, can provide the abrasive force against the 4-halophenyllithium compound. A ball or pebble mill are exemplary devices. A preferred device is an ultrasonic bath such as a Model G–140 made by the National Ultrasonic Corporation which imparts a work force of ultrasonic energy upon the halophenyllithiums.

It is to be understood that within the perimeter of this disclosure and claims that the term "milling" includes all the methods and devices as enumerated above, as well as those known generally throughout the art. The milling is performed under an inert atmosphere such as argon, helium, nitrogen, and the like, and can take place in the presence or absence of an inert diluent such as aliphatic, cycloaliphatic, or aromatic hydrocarbons. In one embodiment, the milling process is carried out during the preparation of the 4-halophenyllithium initiator.

In the milling process, the time employed will depend upon the particular method or milling device chosen, but will at least be sufficient to cause the desired increase in initiator activity. For ball milling or ultrasonic billing, the time employed will range from about one minute to one hundred hours, preferably about one to about twenty-fou rhours. The optimum time period depends, in general, on the efficiency of the equipment used and the particular 4-halophenyllithium compound employed. The frequency and force of collision as in ball milling and the wave frequency, intensity, and absorbing capacity of the ultrasonic milled compound will vary the time employed. The ultrasonic vibration frequency generally will be at least 20 to 1000 kc./s. (kilocycles per second). The intensity, i.e., average rate of energy flow per unit area of the ultrasonic bath, varies from about $10^{-4}$ to 20 w./cm.$^2$ (watts per square centimeter) and preferably from about 0.1 to 10 w./cm.$^2$.

The time period most suitable for any given milling equipment can easily be determined by routine experimentation.

As used herein, the term "ultrasonic" means vibratory waves of a frequency above the limit of the human ear.

The temperature employed during the milling process can be varied over a wide range and is conducted below the melting point of the compound to be milled and is generally in the range of about −50 to 200° C., preferably from about 0 to 100° C.

Exemplary haloaryllithium compounds are 3-bromophenyllithium;
3-bromo-1-naphthyllithium;
3-chlorophenyllithium;
3-chloro-1-naphthyllithium;
3-fluorophenyllithium;
3-fluoro-1-naphthyllithium;
1-chloro-3-naphthyllithium;
1-fluoro-3-naphthyllithium;
1-bromo-3-naphthyllithium;
4-bromophenyllithium;
4-bromonaphthyllithium;
4-chloronaphthyllithium;
4-fluorophenyllithium;
4-fluoronaphthyllithium;
4-bromonaphthyllithium;

and mixtures of the foregoing compounds and the like.

Haloaryllithium compounds employed in this invention can be prepared by any method desired. U.S. Pat. 3,215,679, issued to Trepka, Nov. 2, 1965 discloses suitable procedures.

The process of this invention can be carried out in conventional equipment under conventional conditions. The amount of haloaryllithium initiator employed is generally expressed in terms of milliequivalents of lithium per 100 grams of monomer. The amount of initiator employed should be sufficient to provide from about 0.05 to 50 milliequivalents of lithium per 100 grams of monomer, preferably from about 0.1 to 100 milliequivalents of lithium per 100 grams of monomer (meq. h.).

The temperature employed for the polymerization and/or addition of the modifier of this invention is generally in the range of from about −100 to 150° C., preferably from about −30 to 120° C. The particular temperature employed depends upon the initiator used, the rate of polymerization desired as well as other conditions. The pressure employed during the polymerization is preferably that which is sufficient to maintain the monomeric materials substantially in the liquid phase.

The polymerization can be conducted in the presence or absence of inert hydrocarbon diluents. Aromatic hydrocarbons, paraffins, or cycloparaffins, containing from about 4 to 10 carbon atoms can be preferably employed as diluents. Exemplary diluents are benzene, toluene, cyclohexane, methylcyclohexane, xylene, n-butane, n-hexane, n-pentane, n-heptane, isooctane, and mixtures thereof, and the like.

Monomeric materials employed according to this invention are conjugated dienes preferably containing from about 4 to 12 carbon atoms. This process is particularly suitable for the polymerization of isoprene and butadiene.

Illustrative of the foregoing discussion and not to be interpreted as a limitation on the scope thereof, or on the materials herein employed, the following examples are presented.

EXAMPLE I

Polyisoprene was prepared according to the process of this invention using the following polymerization recipe:

Polymerization recipe

| | |
|---|---|
| Isoprene, parts by weight | 100 |
| Cyclohexane, parts by weight | 1000 |
| 3-bromophenyllithium (BPL) [1] mmoles | 1.3 |
| Tribromobenzene (TBB) mmoles | Variable |
| Time, hours | 2.0 |
| Temperature, ° F. | 158 |

Charge order: Cyclohexane, $N_2$ purge, isoprene, tribromobenzene, BPL, time, terminate.[2]

The polymerization results are reported in Table I and demonstrate that by employing 1,3,5-tribromobenzene (Runs 5–8) according to this invention, the inherent viscosity of the polymer is decreased while the cis-content is essentially maintained. The results also demonstrate that the 1,2,4-tribromobenzene isomer failed to decrease the inherent viscosity of the polymer but contrarily caused an increase in the inherent viscosity.

TABLE I.—POLYMERIZATION RESULTS

| Run No. | TBB Isomer | Mhm.[d] | Conversion percent | Cis percent[a] | Inherent viscosity[b] | Gel percent[c] |
|---|---|---|---|---|---|---|
| 1 | 1,2,4- | 0.025 | 93 | 81 | 3.55 | 0 |
| 2 | 1,2,4- | 0.050 | 92 | 84 | 4.10 | 0 |
| 3 | 1,2,4- | 0.075 | 86 | 91 | 4.57 | 0 |
| 4 | 1,2,4- | 0.10 | 83 | 91 | 5.76 | 0 |
| 5 | 1,3,5- | 0.025 | 93 | 79 | 3.33 | 0 |
| 6 | 1,3,5- | 0.050 | 90 | 83 | 3.40 | 0 |
| 7 | 1,3,5- | 0.075 | 85 | 88 | 3.38 | 0 |
| 8 | 1,3,5- | 0.10 | 79 | 90 | 3.20 | 0 |

[a] Determined according to U.S. 3,215,679, col. 11, lines 4–25.
[b] Determined according to U.S. 3,215,679, col. 11, lines 26–39.
[c] Determined according to U.S. 3,215,679, col. 11, lines 40–63.
[d] Gram millimoles per 100 grams of monomer.

EXAMPLE II

Polyisoprene was prepared according to the polymerization recipe of Example I except that 1.0 mhm. of 3-bromophenyllithium was employed as the polymerization initiator and the polymerization time was 1.5 hour. 1,3,5-trichlorobenzene was employed instead of the 1,3,5-tribromobenzene. The results are reported in Table II.

TABLE II

| Run No. | 1,3,5-trichlorobenzene (mhm.) | Conversion percent[a] | Cis percent[a] | Inherent viscosity[a] |
|---|---|---|---|---|
| 1 | 0 | 86 | 88 | 5.67 |
| 2 | .10 | 79 | 93 | 6.2 |
| 3 | .25 | 80 | 95 | 5.97 |

[a] As reported in Table I.

The above results demonstrate that 1,3,5-trichlorobenzene is ineffective as a polymerization modifier to reduce the inherent viscosity of the resulting polymer.

EXAMPLE III

Polyisoprene was prepared according to the following polymerization recipe and 1,3-dibromobenzene (DBB) employed as a modifier for comparative control runs.

Polymerization recipe

| | Parts by wt. |
|---|---|
| Cyclohexane | 1000 |
| Isoprene | 100 |
| 3-bromophenyllithium (BPL) | (1.2 mhm.) |
| Modifier | Variable |
| Time, hours | 1.5 |
| Temperature, °F. | 158 |

Charge order: Cyclohexane, $N_2$ purge, isoprene, modifier, BLP, adjust temperature, time terminate.

The results of the runs are reported in Table III.

TABLE III

| Run No. | Modifier (mhm.) | Conversion percent [a] | Inherent viscosity [a] | Unsat., percent cis [a] |
|---|---|---|---|---|
| 1 | | 85 | 5.18 | 86 |
| 2 | TBB (0.05) | 76 | 4.68 | 97 |
| 3 | DBB (0.05) | 93 | 5.14 | 92 |
| 4 | DBB (0.10) | 90 | 4.94 | 84 |

[a] As reported in Table I.

Comparison of Runs 2 and 3 demonstrate that at the same molar concentration 1,3,5-tribromobenzene (TBB) is a vastly superior modifier to the dibromobenzene (DBB) and a comparison of Runs 2 and 4 demonstrate that the tribromobenzene is more than twice as effective a modifier as the dibromobenzene on a molar basis.

As will be evident to those skilled in the art, various modifications of this invention can be made or followed in light of the discussion and disclosure herein set forth without departing from the scope or the spirit thereof.

We claim:

1. A polymerization process comprising contacting a conjugated diene having from about 4 to 12 carbon atoms per molecule under polymerization conditions with a haloaryllithium initiator and in the presence of 1,3,5-tribromobenzene in an amount to provide from about 0.01 to about 5 moles of 1,3,5-tribromobenzene per mole of said haloaryllithium initiator, wherein said haloaryllithium initiator can be represented by any one of the following formulas:

(a)

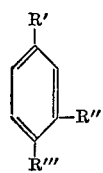

(b)

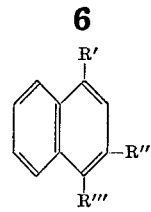

or (c) mixtures of initiators represented by Formulas (a) and (b), wherein $R'$, $R''$, and $R'''$ is one of hydrogen, lithium, or a halogen, said halogen selected from fluorine, bromine, or chlorine, wherein $R'$, $R''$, and $R'''$ are different from each other and wherein only one of $R'$, $R''$, or $R'''$ is a halogen, wherein if $R'''$ is halogen $R''$ is not lithium, wherein if $R''$ is halogen $R'''$ is not lithium, and wherein the amount of said haloaryllithium polymerization initiator is sufficient to provide in the range from about 0.05 to 50 gram milliequivalents of lithium per 100 grams of monomer.

2. The process of claim 1 wherein the amount of said haloaryllithium polymerization initiator is sufficient to provide in the range from about 0.1 to 10 milliequivalents of lithium per 100 grams of monomer, and wherein from about 0.02 to 0.15 mole of 1,3,5-tribromobenzene is provided for each mole of said haloaryllithium initiator.

3. The process according to claim 1 wherein said 1,3,5-tribromobenzene is charged prior to the time of polymerization reaction has undergone 70 percent conversion of monomer to polymer and wherein said polymerization is conducted at a temperature in the range of about −100 to 150° C. at a pressure sufficient to maintain the monomeric materials essentially in liquid phase and in the presence of an inert hydrocarbon diluent comprising aromatic hydrocarbons, paraffins, or cycloparaffins, containing from about 4 to 10 carbon atoms per molecule.

4. The process of claim 3 wherein said conjugated diene is butadiene and said haloaryllithium initiator is 3-bromophenyllithium.

5. The process of claim 3 wherein said conjugated diene is isoprene and said haloaryllithium initiator is 3-bromophenyllithium.

References Cited

UNITED STATES PATENTS

| 3,318,862 | 5/1967 | Hinton | 260—94.2 |
| 3,393,189 | 7/1968 | Trepka et al. | 260—94.2 |
| 3,514,436 | 5/1970 | Trepka et al. | 260—94.2 |

JOSEPH L. SCHOFER, Primary Examiner

W. F. HAMROCK, Assistant Examiner

U.S. Cl. X.R.

252—431